US010230787B2

(12) United States Patent
Hyunh et al.

(10) Patent No.: US 10,230,787 B2
(45) Date of Patent: Mar. 12, 2019

(54) SYSTEM AND METHOD FOR MANAGING DISTRIBUTED CLUSTER IDENTITY

(71) Applicant: Dell Products L.P., Round Rock, TX (US)

(72) Inventors: Thi D. Hyunh, Round Rock, TX (US); Marshal F. Savage, Austin, TX (US); Cyril Jose, Austin, TX (US); Yee Ja, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 15/211,248

(22) Filed: Jul. 15, 2016

(65) Prior Publication Data

US 2018/0019923 A1    Jan. 18, 2018

(51) Int. Cl.
*H04L 29/08* (2006.01)

(52) U.S. Cl.
CPC .................................... *H04L 67/10* (2013.01)

(58) Field of Classification Search
CPC ............................... H04L 41/12; H04L 67/10
USPC ........................................................ 709/223
See application file for complete search history.

(56) References Cited

U.S. PATENT DOCUMENTS

| | | | | |
|---|---|---|---|---|
| 9,269,081 B1* | 2/2016 | Panzer | ................. | G06Q 50/01 |
| 2002/0156875 A1* | 10/2002 | Pabla | ........................ | H04L 1/24 |
| | | | | 709/220 |
| 2008/0235333 A1* | 9/2008 | Miller | ................... | G06F 9/5061 |
| | | | | 709/204 |
| 2008/0250407 A1* | 10/2008 | Dadhia | ............... | G06F 9/45533 |
| | | | | 718/1 |
| 2014/0337344 A1* | 11/2014 | Wu | ..................... | G06K 9/00677 |
| | | | | 707/738 |
| 2017/0085691 A1* | 3/2017 | Kim | ................ | H04M 1/274508 |
| 2018/0113943 A1* | 4/2018 | Guo | ................... | G06F 17/30867 |

* cited by examiner

*Primary Examiner* — Nicholas R Taylor
*Assistant Examiner* — Chong G Kim
(74) *Attorney, Agent, or Firm* — Baker Botts L.L.P.

(57) ABSTRACT

Methods and systems for managing distributed group identity may involve exchanging, at a node in a group, node identifiers with another node in the group, sorting the node identifiers, selecting an identifier from the sorted identifier, proposing the selected identifier as a persistent group name, setting the persistent group name based on the proposed identifier, setting a user administered name based on the proposed identifier, determining that the user administered name is consistent across the group, and updating the user administered name to resolve the inconsistency. The persistent group name is common across the group.

20 Claims, 3 Drawing Sheets

SYSTEM AND METHOD FOR MANAGING DISTRIBUTED CLUSTER IDENTITY

BACKGROUND

Field of the Disclosure

This disclosure relates generally to information handling systems and more particularly to systems and method for managing distributed cluster identity.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. A cluster of information handling systems may also be grouped together.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A plurality of information handling systems may be grouped into a cluster, also known as a group or distributed group. The cluster may have an identity to uniquely identify the cluster from others. On occasion, the cluster identity may need to be updated; however, changes often require atomic operations to avoid orphaned nodes in the cluster. Nodes in the cluster may yet still be orphaned during atomic operations due to unstable networks or networks with significant chatter. Thus, it may be desirable to provide for systems and methods for managing a cluster identity. Each node in the cluster may include a secondary information handling system, which may be in the form of a management controller. The management controller may communicate with management controllers on other nodes to manage the identity of the cluster.

In one aspect, a disclosed method for managing distributed group identity may include exchanging, at a node in a group, node identifiers with another node in the group, sorting the node identifiers, selecting an identifier from the sorted identifiers, proposing the selected identifier as a persistent group name, setting the persistent group name, setting the user administered name based on the proposed identifier, determining that the user administered name is inconsistent across the group, and updating the user administered name to resolve the inconsistency. The persistent group name and/or user administered name may be based on the proposed identifier.

In certain embodiments, the user administered name may be updated to a unified user administered name, which may be identified by a master of the group based on a node in the group with the most recent timestamp. The most recent timestamp may represent when the node joined the group and/or when the name of the node changed. The timestamp may include at least one of a Lamport timestamp and a Unix-based timestamp. The method may include determining that the persistent group name is inconsistent across the group and resolving the inconsistent group name by setting the persistent group name to a unified persistent group name. In certain embodiments, determining that the user administered name is inconsistent across the group may be based on a node failing during a cluster identity change configuration operation. In certain embodiments, the node may be a master of the group and the method may include distributing the persistent group name from the master to another node in the group and distributing the unified persistent group name to resolve the inconsistent persistent group name. Determining that the plurality of group identifiers exist in the group may be based on a plurality of nodes moving within a network.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
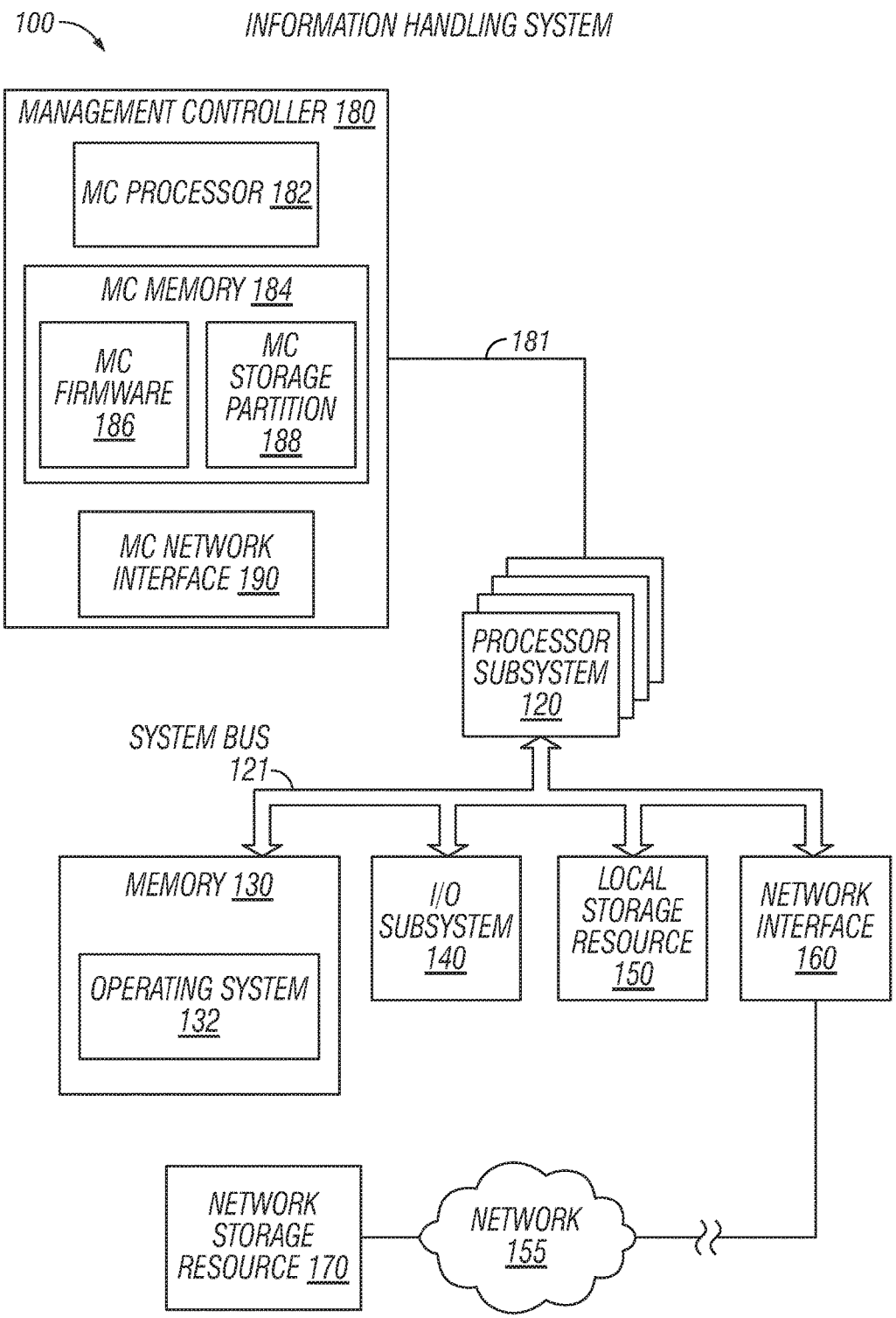
FIG. 1 is a block diagram of selected elements of an information handling system for manage distributed group identity, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
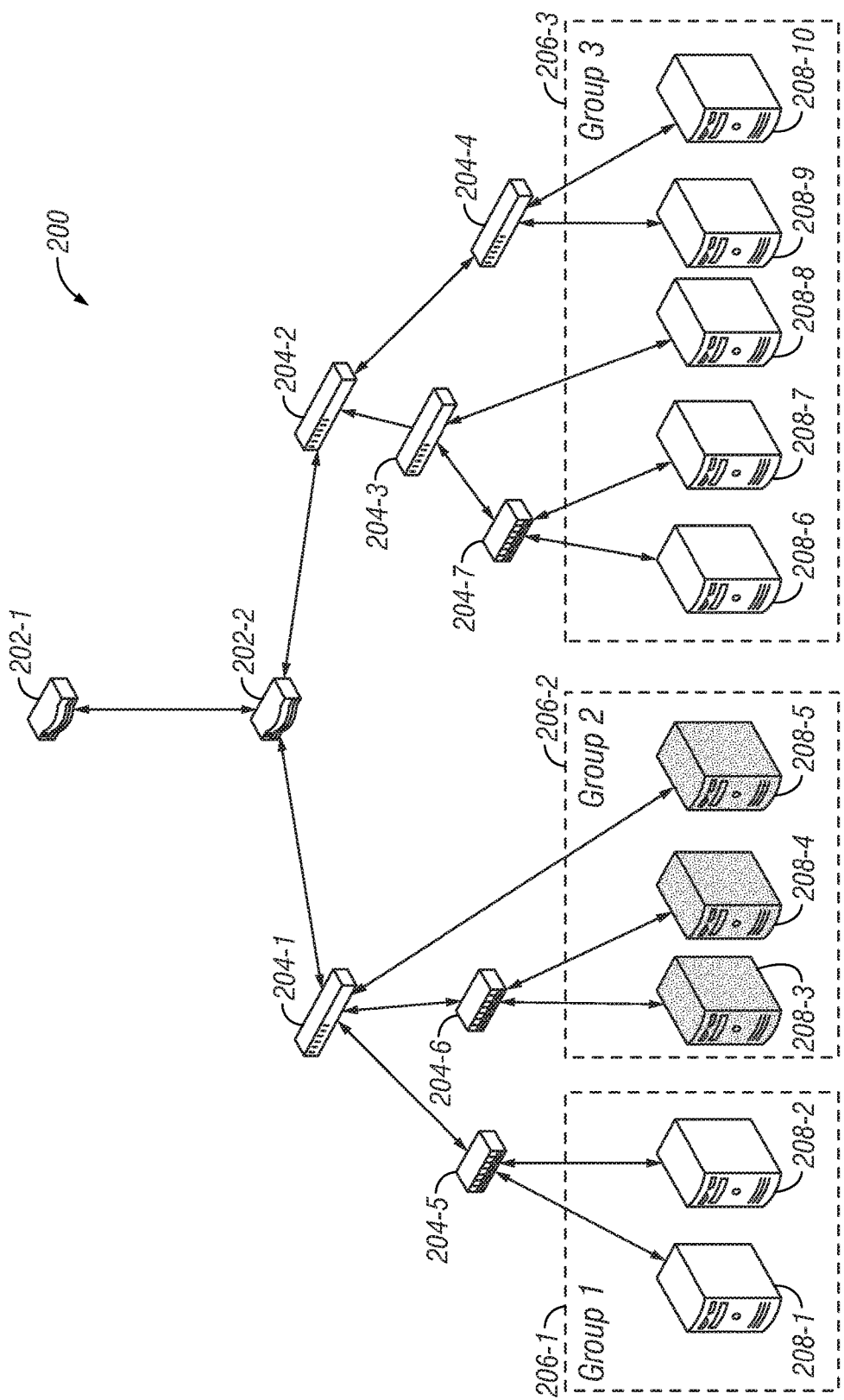
FIG. 2 is a block diagram of selected elements of a distributed group, in accordance with some embodiments of the present disclosure.
Figure 3:
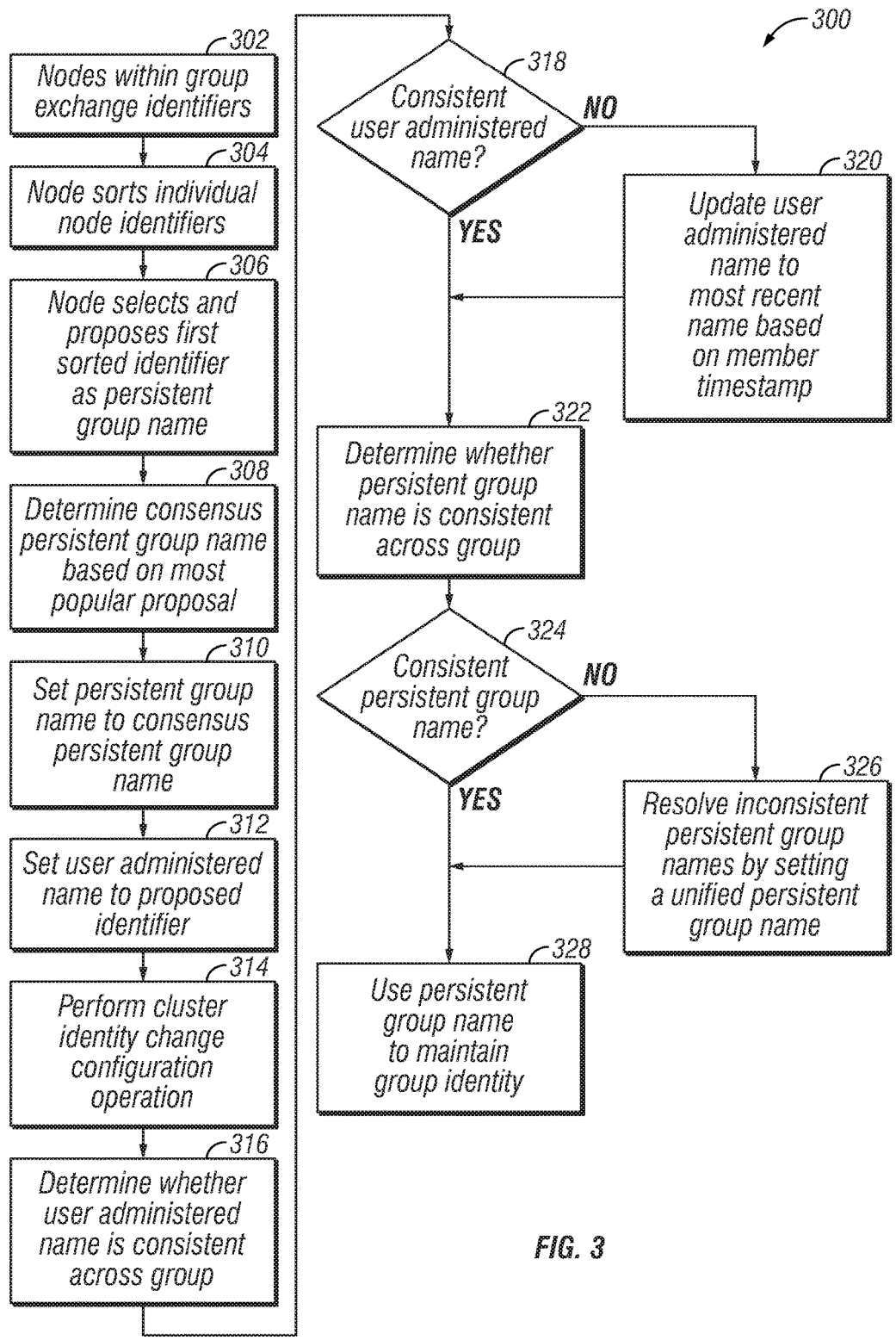
FIG. 3 is a flow chart depicting selected elements of a method for managing a distributed group identity, in accordance with some embodiments of the present disclosure.

Particular embodiments are best understood by reference to FIGS. 1-3 wherein like numbers are used to indicate like and corresponding parts.

Turning now to the drawings, FIG. 1 illustrates a block diagram depicting selected elements of an embodiment of information handling system 100 for managing distributed group identity. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system. Management controller 180 may communicate with other management controllers using MC network interface 190. A set of management controllers in communication may form a group, in which each management controller may be a node.

Information handling system 100 may be arranged as a node in a distributed group or cluster. The node may connect to other nodes via network interface 160 and/or MC network interface 190. The distribution group or cluster may have an identity to distinguish itself from other groups. On occasion, the identity may need to be updated or changed via a cluster identity change configuration operation. For example, the group or part of the group may be migrated, moved, or realigned as a user's functional need varies or as the physical network or other aspect of one or more information handling systems within the network varies. A network with unstable network settings, a network with saturation, or a network with significant chatter may inhibit a reliable update of the group identity, which may cause a node to become orphaned. An orphaned node may have and old group identity, rather than the current group identity. As described herein, the distributed group may improve the stability and reliably of the update by enabling a multiple part group identity. The distributed group may also manage each part of the group collectively to avoid conflicting identities and orphaned nodes.

Referring now to FIG. 2, a block diagram of selected elements of a distributed group 200 is shown in accordance with some embodiments of the present disclosure. The distributed group 200 may include a one or more routers 202, which form part of a network. The network may be a public and/or private network. Router 202-2 may route data between different distributed groups and/or within a distributed group. The distributed group 200 may also include one or more switches 204. Downstream of the routers, switches 204-1 and 204-2 may interface exclusively with other switches (204-3, 204-4, 204-5, 204-6 and 204-7). The switches 204 and routers 202 may collectively operate to facilitate the transmission of messages between the nodes in the distributed group.

The nodes may be grouped together to perform a particular type of function. For example, group 206-1 may include two information handling systems 208-1 and 208-2, which may be used for a SharePoint application. Group 206-2 may include three information handling systems 208-3, 208-4, and 208-5, which may be used for file and print operations. Group 206-3 may include five information handling systems 208-6, 208-7, 208-8, 208-9, and 208-10, which may be used for running various other applications. Although a particular number of information handling systems are shown, any number of information handling systems may be configured to form part of a distributed group used to manage a cluster identity. For example, groups 206 may be subsystems within the same information handling system, such as a virtualized environment operating on the information handling system.

The unique group identity or cluster identity may be shared across the distributed group 200 and/or exposed to the network, which may be a public and/or private network. The unique group identity may include two parts. The first part may be a persistent group name, which may be intended for infrequent modification. In one embodiment, the persistent group name may be associated with the universally unique identifier (UUID) of a node in the group. The node may be the first node of the group, or in the case of the group being created from an information handling system, the node from which the group was created. In another embodiment, the persistent group name may be derived from a name for the group. For example, a group focused on SharePoint services may be named "SharePoint Group One" and the derived persistent group name may be "SharePoint1." A set of nodes with the same persistent group name indicates that the nodes belong to the same group. The persistent group name may be self-identified by distributed group 200 without the need to assign a group persistent name to the group or to externally manage the persistent group name. Self-identification may include the group determining the persistent group name without intervention or interaction by an external management controller and/or user. A cluster identity change configuration operation may maintain the persistent group name without modification. Once the group identifies the persistent group name, a new member joining the group may receive the persistent group name from the current group master using an initial group handshake message.

The second part may be a user administered name, which may be administered for more frequent modification than the first part. A set of nodes with the same user administered name may indicate that the nodes belong to the same group. A node in the group may use the user administered name to initially discover and communicate with a master to join the group. A master may perform management and/or administrative functions for the group. The master may be a member of the group and may be selected or elected. In one embodiment, the master may be elected at random. In another embodiment, the master may be selected using the timestamp of entry into the group for the member. The most recent member to join the group or the least recent member to join the group may be selected as the master. A cluster identity change configuration operation may modify the user administered name for each node in a group.

Referring now to FIG. 3, a flow chart depicting selected elements of a method for managing a distributed group identity is shown in accordance with some embodiments of the present disclosure. Method 300 may be implemented by any of the elements shown in FIGS. 1 and 2. Method 300 may be initiated by any suitable criteria and may initiate operation at any suitable point. In one embodiment, method 300 may initiate operation at 302. Method 300 may include greater or fewer steps than those illustrated. Moreover, method 300 may execute its steps in an order that is different than those illustrated below. Method 300 may terminate at any suitable step. Moreover, method 300 may repeat operation at any suitable step. Portions of method 300 may be performed in parallel and repeat with respect to other portions of method 300.

At 302, the nodes within a group may exchange node identifiers. The node identifiers exchanged may be referred to as proposed identifiers. In one embodiment, a proposed identifier may be a universally unique identifier (UUID). The UUID may be of any appropriate size and have any appropriate representation, including but not limited to 128 bits in length and a representation in hexadecimal or ASCII. The UUID may uniquely identify the node in the group. In another embodiment, the node identifier may be configured by the user or may be derived from prior information exchanged with the group, such as the name of the group. For example, a group may be named "file and print group 1" and the node identifier may be "fp 1.1," in which "fp 1" is derived from the name of the group and ".1" is a unique identifier for the node. The exchange of node identifiers may occur by sending messages over the distributed network. In one embodiment, MC network interface 190 may facilitate the exchange. In another embodiment, network interface 160 may facilitate the exchange.

At 304, a node may sort individual node identifiers in order. In one embodiment, the sort may be in increasing numerical order, such as ascending ASCII order. In another embodiment, the sort may be in decreasing numerical order. In a further embodiment, the sort may be sorted hashes of the individual node identifiers. At 306, a node may select the first sorted node identifier as a proposed group name. The first sorted identifier may be the first entry in the sorted list of identifiers. In one embodiment, each of the nodes in the cluster may select a first sorted node identifier and propose that node identifier as the persistent group name or as a basis for deriving the persistent group name. The node may propose a persistent group name by sending the proposed name to the other nodes in the cluster or to the master of the cluster.

At 308, a consensus persistent group name may be determined based on the most popular proposal. The consensus persistent group name may be identical to or derived from the most popular proposal. In one embodiment, a master may perform the determination. In another embodiment, each node may perform the determination. The most popular proposal may represent the proposed persistent group name with the most proposals from nodes in the group. At 310, a persistent group name may be set to the consensus persistent group name, which may be used on a long-term basis without frequent changes. For example, the persistent group name may remain constant despite one or more members leaving the group and/or the rotation or fail over of the master of the group. Method 300 may jump to method step 312 based on the determination that a prior persistent group name is identified for the group, which may occur when the persistent group name assigned to a new group is configured simultaneously at more than on node. At 312, a user administered name may be set and/or updated to a unified user administered name, which may be identified by the current group master and may be based on the node in the group with the most recent timestamp. The most recent timestamp may represent when the node which joined the group. The timestamp may include a Lamport timestamp and/or a Unix-based timestamp. Although both the user administered name and the persistent name are related to the identifier proposed in method step 302, the user administered name may be used on a shorter-term basis than the persistent group name.

At 314, a cluster identity change configuration operation may be performed. The cluster identity change configuration operation may include modifying the user administered name for each node in the group and maintaining the same persistent group name. The cluster identity may be changed for any suitable reason, including but not limited to the cluster or group being repurposed for another type of use or another type of application. In one embodiment, the cluster identity change configuration operation may be performed by returning to method step 302. In another embodiment, a master of the cluster may manage a cluster identity change configuration operation by distributing an updated user administered name to the members of the group. At 316, it may be determined whether a user administered name is consistent across the group. The determination may occur at any suitable time including, but not limited to, when the node undergoes a disconnection from the group and then re-enters the group. The disconnection may be due to network jitter or a break in connectivity to the physical network. Consistency may be determined, at the current group master, by matching the user administered name of a node with the user administered name of one or more other nodes in the group. If the user administered name is not consistent, method 300 may proceed to method step 320. Otherwise, method 300 may proceed to method step 322. At 320, if the user administered name is not consistent, the user administered name may be updated, by the current master of the group, which may identify a unified user administered name based on a node in the group with the last or most recent timestamp. The timestamp may be a Lamport and/or epoch/Unix timestamp. A Lamport timestamp may enable the proper ordering of events across the nodes in a distributed group. The latest or most recent timestamp may be determined by comparing the timestamps corresponding to when the user administered name was set or when the member joined the group.

At 322, it may be determined whether the persistent group name is consistent across the group. The determination may be made by comparing the persistent group name of one node to the persistent group name of one or more other nodes. The persistent group name may not be consistent for any suitable reason, including but not limited to a node not receiving an update to the persistent group name due to network instability or network chatter, or data corruption at a node. If the persistent group name is not consistent, method 300 may proceed to method step 326. Otherwise, method 300 may proceed to method step 328.

At 326, if the persistent group name is not consistent, the inconsistency may be resolved by setting a unified persistent group name. In one embodiment, the unified persistent group name may be determined by returning to method step 302. In another embodiment, a master of the group or cluster may maintain a master persistent group name and may send a message to one or more nodes having an inconsistent persistent group name. The message may be sent as a whisper, which may be a singlecast or unicast message sent to a particular node. The unified persistent group name may be oldest or most recent persistent group name among the inconsistent names. The old or most recent name may be determined based on the timestamp corresponding to the time when the persistent group name was set or when the member joined the group. At 328, the persistent group name, which may have been unified in method step 326, may be used to maintain the group identity.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing distributed group identity, comprising:
    exchanging, at a node in a group, node identifiers with another node in the group;
    sorting the node identifiers;
    selecting an identifier from the sorted node identifiers;
    proposing the selected identifier as a persistent group name to the other node in the group;
    setting the persistent group name based on the proposed identifier, wherein the persistent group name is common across the group;
    setting a user administered name based on the proposed identifier;
    updating the user administered name to a second user administered name during a cluster identity change configuration, wherein the persistent group name is maintained during the cluster identity change configuration;
    determining that the second user administered name is inconsistent across the group based on a node in the group maintaining the user administered name after the cluster identity change configuration; and
    updating the second user administered name to resolve the inconsistency.

2. The method of claim 1, wherein the second user administered name is updated to a unified user administered name identified by a master of the group based on a node in the group with a most recent timestamp.

3. The method of claim 1, further comprising:
    determining that the persistent group name is inconsistent across the group; and
    resolving the inconsistent persistent group name by setting the persistent group name to a unified persistent group name.

4. The method of claim 1, wherein the node in the group maintains the user administered name after the cluster identity change configuration due to data corruption at the node.

5. The method of claim 2, wherein the most recent timestamp represents when the node joined the group, the timestamp including at least one of a Lamport timestamp and a Unix-based timestamp.

6. The method of claim 3, wherein the node is a master of the group and further comprising:
    distributing the persistent group name from the master to the other node in the group; and
    distributing the unified persistent group name to resolve the inconsistent persistent group name.

7. An information handling system, comprising:
    a processor subsystem having access to a first memory;
    a management controller comprising a secondary processor having access to a second memory, the second memory including an embedded storage partition and the second memory storing instructions executable by the secondary processor to:

exchange, at a node in a group, node identifiers with another node in the group;

sort the node identifiers;

select an identifier from the sorted node identifiers;

propose the selected identifier as a persistent group name to the other node in the group;

set the persistent group name based on the proposed identifier, wherein the persistent group name is common across the group;

set a user administered name based on the proposed identifier;

update the user administered name to a second user administered name during a cluster identity change configuration, wherein the persistent group name is maintained during the cluster identity change configuration;

determine that the second user administered name is inconsistent across the group based on a node in the group maintaining the user administered name after the cluster identity change configuration; and update the second user administered name to resolve the inconsistency.

8. The information handling system of claim 7, wherein the second user administered name is updated to a unified user administered name identified by a master of the group based on a node in the group with a most recent timestamp.

9. The information handling system of claim 7, further comprising instructions executable by the secondary processor to:

determine that the persistent group name is inconsistent across the group; and resolve the inconsistent persistent group name by setting the persistent group name to a unified persistent group name.

10. The information handling system of claim 7, wherein the node in the group maintains the user administered name after the cluster identity change configuration due to data corruption at the node.

11. The information handling system of claim 8, wherein the most recent timestamp represents when the node joined the group, the timestamp including at least one of a Lamport timestamp and a Unix-based timestamp.

12. The information handling system of claim 9, wherein the node is a master of the group and further comprising instructions to:

distribute the persistent group name from the master to the other node in the group; and distribute the unified persistent group name to resolve the inconsistent persistent group name.

13. The information handling system of claim 9, wherein the instructions to determine that the persistent group name is inconsistent across the group is based on the group being moved within a network.

14. A management controller for an information handling system having a primary processor and a primary memory, the management controller comprising:

a secondary processor having access to a second memory, the second memory including an embedded storage partition and the second memory storing instructions executable by the secondary processor to:

exchange, at a node in a group, node identifiers with another node in the group;

sort the node identifiers;

select an identifier from the sorted node identifiers;

propose the selected identifier as a persistent group name;

set the persistent group name based on the proposed identifier, wherein the persistent group name is common across the group;

set a user administered name based on the proposed identifier;

update the user administered name to a second user administered name during a cluster identity change configuration, wherein the persistent group name is maintained during the cluster identity change configuration;

determine that the second user administered name is inconsistent across the group based on a node in the group maintaining the user administered name after the cluster identity change configuration; and update the second user administered name to resolve the inconsistency.

15. The management controller of claim 14, wherein the second user administered name is updated to a unified user administered name identified by a master of the group based on a node in the group with a most recent timestamp.

16. The management controller of claim 14, further comprising instructions executable by the secondary processor to:

determine that the persistent group name is inconsistent across the group; and resolve the inconsistent persistent group name by setting the persistent group name to a unified persistent group name.

17. The management controller of claim 14, wherein the node in the group maintains the user administered name after the cluster identity change configuration data corruption at the node.

18. The management controller of claim 15, wherein the most recent timestamp represents when the node joined the group, the timestamp including at least one of a Lamport timestamp and a Unix-based timestamp.

19. The management controller of claim 16, wherein the node is a master of the group and further comprising instructions to:

distribute the persistent group name from the master to the other node in the group; and distribute the unified persistent group name to resolve the inconsistent persistent group name.

20. The management controller of claim 16, wherein the instructions to determine that the persistent group name is inconsistent across the group is based on the group being moved within a network.

* * * * *

UNITED STATES PATENT AND TRADEMARK OFFICE
CERTIFICATE OF CORRECTION

PATENT NO. : 10,230,787 B2
APPLICATION NO. : 15/211248
DATED : March 12, 2019
INVENTOR(S) : Thi D. Huynh et al.

It is certified that error appears in the above-identified patent and that said Letters Patent is hereby corrected as shown below:

On the Title Page

Item (72) Inventors: Thi D. Hyunh, Round Rock, TX (US) should read -- Thi D. Huynh, Round Rock, TX (US) --

Signed and Sealed this
Thirtieth Day of April, 2019

Andrei Iancu
*Director of the United States Patent and Trademark Office*